July 7, 1925.

W. J. VOLPERT

TIRE CARRIER

Filed Sept. 29, 1924

William J. Volpert,
INVENTOR

BY Victor J. Evans
ATTORNEY

WITNESS:

July 7, 1925.
W. J. VOLPERT
TIRE CARRIER
Filed Sept. 29, 1924
1,545,375
2 Sheets-Sheet 2
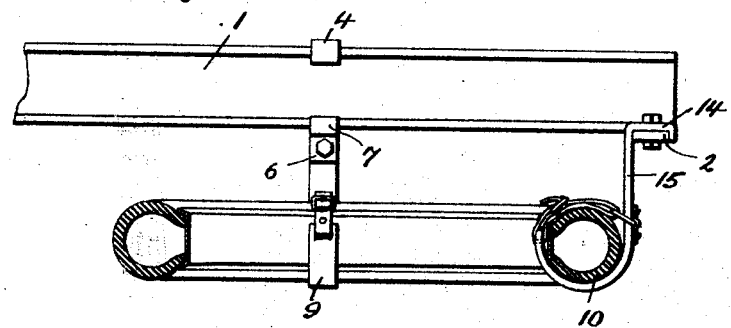
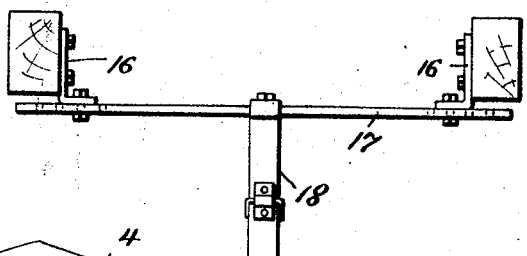
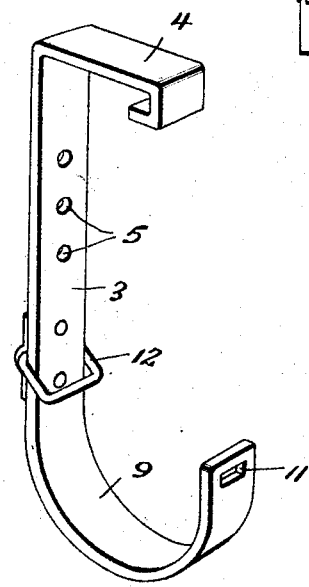
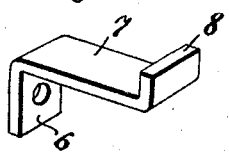
William J. Volpert
INVENTOR
BY Victor J. Evans
ATTORNEY
WITNESS: Gerald Hennesy Patented July 7, 1925.

1,545,375

UNITED STATES PATENT OFFICE.

WILLIAM J. VOLPERT, OF PERU, INDIANA.

TIRE CARRIER.

Application filed September 29, 1924. Serial No. 740,669.

*To all whom it may concern:*

Be it known that I, WILLIAM J. VOLPERT, a citizen of the United States, residing at Peru, in the county of Miami and State of Indiana, have invented new and useful Improvements in Tire Carriers, of which the following is a specification.

My present invention has reference to a tire carrier for trucks.

Spare tires cannot be conveniently carried on trucks, for the reason that the back thereof is generally employed as the entrance to the truck, while carriers arranged on the sides interfere with the entrance to the driver's seat or are otherwise inconveniently positioned. It may therefore be considered the primary object of this invention to produce a means for supporting a tire between the sills of the body of the truck.

It is a still further object to produce a tire carrier for trucks which embodies the desirable features of simplicity in construction, ease in application, coupled with thorough efficiency for the purpose designed.

To the attainment of the foregoing and other objects which will appear as the nature of the invention is better understood, reference is to be had to the drawings which accompany and which form part of this application.

In the drawings:—

Figure 3 is a sectional view on the line 3—3 of Figure 1.

Figure 4 is an end view showing the arrangement of the rear hanger on a truck provided with wooden sills.

Figure 5 is a perspective view of one of the hangers.

Figure 6 is a similar view of one of the hook members.

Figure 1:
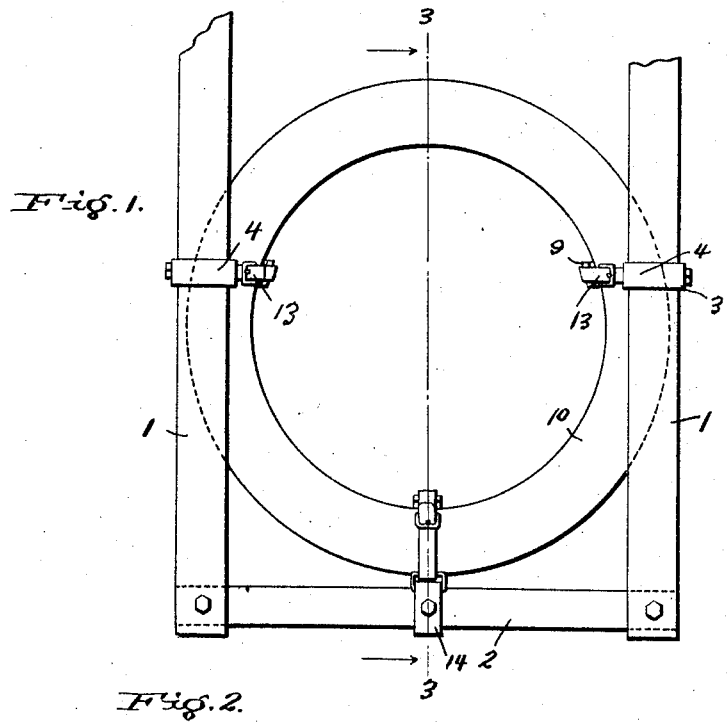
Figure 1 is a top plan view of the sills of an automobile truck showing the tire supported thereon in accordance with this invention.
Figure 2:
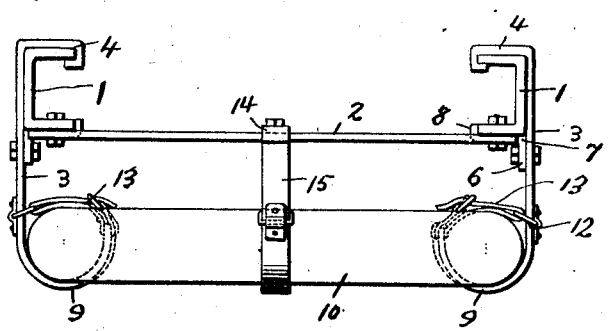
Figure 2 is an end view thereof.

In the construction disclosed in Figures 1, 2 and 3 of the drawings, the side sills 1 of a truck frame are of the usual channeled irons. In carrying out my invention, I secure to the sills 1, at the outer ends thereof, a plate 2.

Supported on the sills, inward of the plate 2 are diametrically disposed hangers. Each of the hangers is in the nature of a metal strap or plate whose body is indicated by the numeral 3. The body 3, at one end thereof is bent angularly and from thence downwardly and inwardly, providing a hook 4. The hook is designed to be arranged over the top of the sills, and the beak of the hook is adapted to grip the under face of the upper flange of the said sills. The body 3 is provided with any desired number of spaced apertures 5, and through one of these apertures there is passed a securing means for the downturned flange 6 of a metal plate 7. The plate has its outer end bent outwardly, as at 8. The plate is thus in the nature of a hook and the said hook is designed to underlie and to engage the lower flange of the sills. By providing the body of the hangers 3 with the spaced apertures, the removable hook 7 may be adjusted to properly engage sills of varying thicknesses.

Each body 3 terminates in an inwardly and upwardly rounded portion 9 that provides a seat or rest for a pneumatic tire 10. The outer portion of each rest 9 is slotted, as at 11, while pivotally secured on the body 3 there is a loop 12. There is passed between the loop and through the slot 11 a fastening means for the tire. The fastening means, in the showing of the drawings, are in the nature of straps 13, one end carrying a buckle and the other end having apertures for the reception of the tongue of the buckle. Of course, other means may be employed, especially when it is desirable to lock the tire in the carrier.

The hangers are disposed approximately at the central points of the tire, and to more effectively support the same, I secure on the plate 2 a tongue 14 formed on one end of a hanger 15. The lower end of the hanger is rounded, as are the hangers previously described, and the means for retaining the tire seated in the hanger 15 may be also similar to that previously described.

When the device is employed in connection with trucks having wooden sills, as disclosed in Figure 4 of the drawings, I secure to the inner face of each sill at or adjacent to the ends thereof angle brackets 16. These brackets have connected to the under faces thereof a plate 17, similar to the plate 2. Both the plates 2 and 17 are preferably formed with a series of apertures through which the securing means pass and whereby these plates may be attached to trucks of varying widths. The plate 17 carries a hanger 18 similar to the hanger 15, and the sills 16 have attached thereto hangers similar to the hangers 3.

Having described the invention, I claim:—

In combination with a truck including the sills therefor, of a means for supporting tires beneath the sills, including a plate fixed to the ends of the sills, a hanger having an upper hooked end received over and in gripping engagement with the plate, securing means between the hanger and plate, hangers also having hooked ends arranged over and in gripping engagement with the sills of the truck, removable and adjustable hook members on the last mentioned hangers to engage with and grip the lower portion of said sills, all of said hangers having their lower ends inwardly rounded to provide seats for a tire, bails carried by the hangers, flexible tire holding means passing through the bails, and said fastening members designed to also pass through slots in the outer rounded ends of the hangers.

In testimony whereof I affix my signature.

WILLIAM J. VOLPERT.